United States Patent
Evans et al.

(10) Patent No.: US 9,193,012 B1
(45) Date of Patent: Nov. 24, 2015

(54) NICKEL REPAIR OF TITANIUM SURFACES

(71) Applicant: Goodrich Corporation, Charlotte, NC (US)

(72) Inventors: Edward Evans, Toronto (CA); Glenn Forbes, Oakville (CA); Mirko Zdero, Dundas (CA)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 14/480,243

(22) Filed: Sep. 8, 2014

(51) Int. Cl.
| C25D 5/34 | (2006.01) |
| C25D 17/14 | (2006.01) |
| B23P 6/00 | (2006.01) |
| B05D 1/28 | (2006.01) |
| B05D 1/36 | (2006.01) |
| B05D 3/12 | (2006.01) |
| B05D 3/00 | (2006.01) |
| B05D 5/00 | (2006.01) |
| B05D 7/14 | (2006.01) |
| C23C 18/16 | (2006.01) |
| C23C 18/32 | (2006.01) |
| C25D 5/14 | (2006.01) |
| C25D 5/38 | (2006.01) |
| C25D 9/04 | (2006.01) |
| C25D 5/42 | (2006.01) |

(52) U.S. Cl.
CPC ... *B23P 6/00* (2013.01); *B05D 1/28* (2013.01); *B05D 1/36* (2013.01); *B05D 3/007* (2013.01); *B05D 3/12* (2013.01); *B05D 5/005* (2013.01); *B05D 7/14* (2013.01); *C23C 18/1637* (2013.01); *C23C 18/1653* (2013.01); *C23C 18/1689* (2013.01); *C23C 18/32* (2013.01); *C25D 5/14* (2013.01); *C25D 5/38* (2013.01); *C25D 5/42* (2013.01); *C25D 9/04* (2013.01)

(58) Field of Classification Search
None
See application file for complete search history.

(56) References Cited

U.S. PATENT DOCUMENTS

| 4,904,352 A * | 2/1990 | Witte | C25D 5/12 205/148 |
| 2006/0039794 A1* | 2/2006 | Stonitsch et al. | 416/241 R |
| 2006/0045785 A1* | 3/2006 | Hu | B23P 6/007 419/5 |
| 2009/0090634 A1* | 4/2009 | Radatz | C25D 5/06 205/206 |
| 2012/0305825 A1* | 12/2012 | Mori et al. | 251/368 |

* cited by examiner

Primary Examiner — Khaja Ahmad
(74) Attorney, Agent, or Firm — Snell & Wilmer, LLP.

(57) ABSTRACT

The present disclosure includes methods for coating and/or repairing a surface of a titanium metal part. Uncoated or damaged portions of the surface of titanium parts are prepared for coating, followed by applying a first coating. A second coating may then be applied to form a coated or repaired surface. The coated or repaired surface may be machined to produce a finished surface having a predetermined thickness.

6 Claims, 5 Drawing Sheets

NICKEL REPAIR OF TITANIUM SURFACES

FIELD

The present disclosure relates generally to coating titanium surfaces and more specifically, to repairing and coating surfaces of titanium aircraft parts.

BACKGROUND

Titanium and titanium alloys are increasingly used in applications where a high strength to weight ratio is important. Titanium-based metals are frequently used in aerospace applications, such as in airframes and aircraft parts. Although titanium-based metals exhibit suitable strength, reliability, and corrosion resistance for many aerospace applications, repairing titanium-based metal parts may be difficult. Specifically, repairing or restoring titanium surfaces may be difficult.

SUMMARY

A method for coating a titanium surface in accordance with an embodiment may comprise providing an uncoated portion of the titanium surface, applying a brush coated base coat of nickel to form a prepared surface, and applying a coating material to the prepared surface to form a coated surface. The coating material may comprise nickel, and may be applied via an electroless process and/or an electroplating process. The coated surface may comprise a predetermined thickness. The method may further comprise machining the coated surface to a predetermined thickness. The method may further comprise applying a second coating material to the coated surface to form a finished surface. The titanium surface may comprise Titanium 62222 alloy.

A method for repairing a damaged titanium surface in accordance with an embodiment may comprise applying a brush coated base coat of nickel to the damaged titanium surface to form a prepared damaged surface, applying a first coating to the prepared damaged surface to form a partially repaired surface, and applying a second coating to the partially repaired surface to form a repaired surface. The second coating may be nickel, such as a sulfamate nickel coating. The first coating may be applied via an electroless process. The second coating may be applied via an electroplating process. The repaired surface may comprise a thickness that is substantially the same as a thickness of an undamaged surface. The method may further comprise machining the repaired surface to a predetermined thickness to form a finished surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

In various embodiments of the present disclosure, methods for coating and/or repairing a surface of a titanium part are described. Conventionally, titanium parts or parts having titanium surfaces may be difficult to coat or repair. As such, many parts are removed from an aircraft and replaced when they are out of dimensional tolerance. Methods of the present disclosure may be used to repair and potentially prevent premature replacement of such titanium parts.

Figure 1:
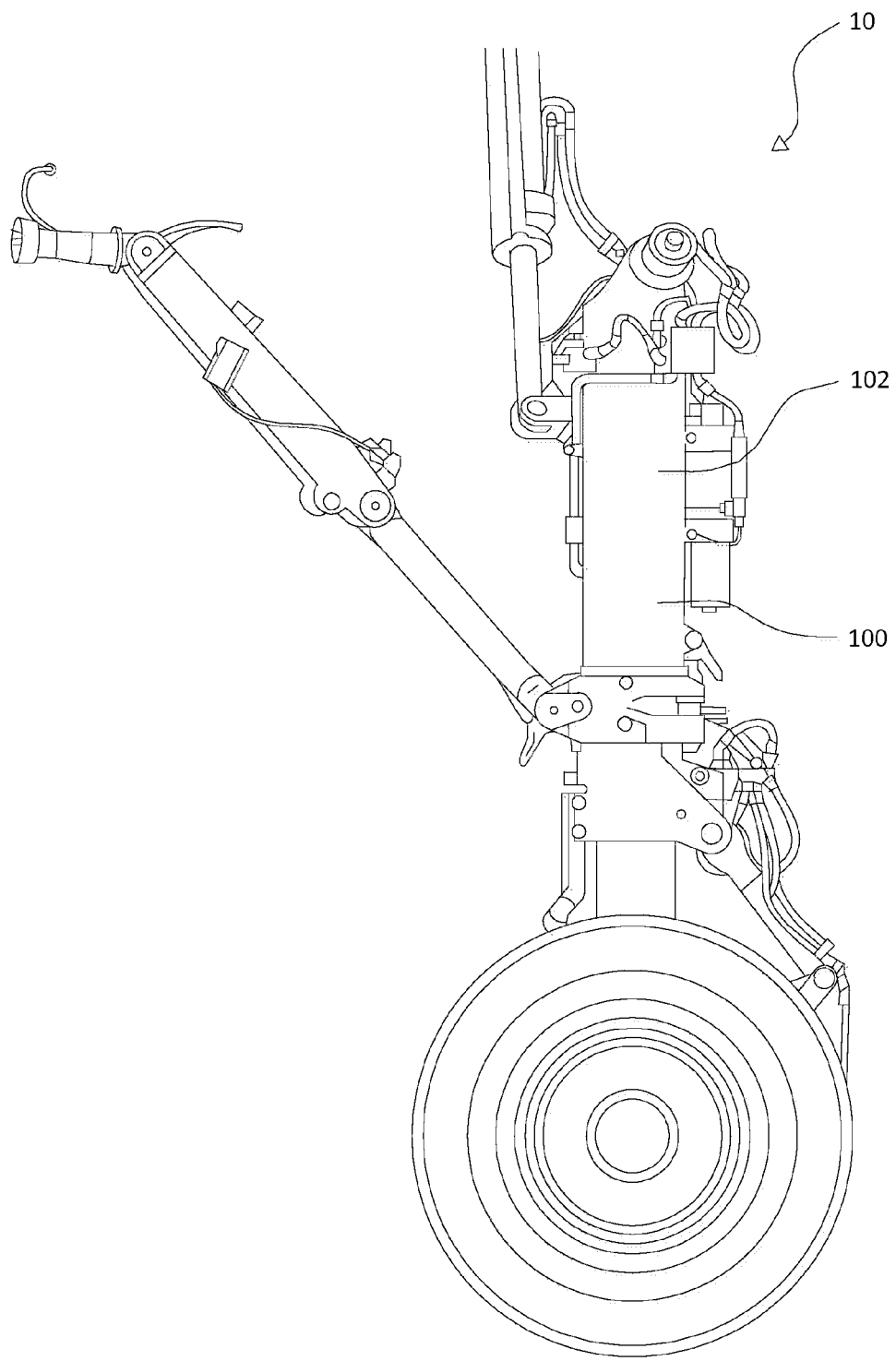
FIG. 1 illustrates a side view of landing gear in accordance with the present disclosure.

Accordingly, with reference to FIG. 1, a landing gear 10 including a titanium part 100 is illustrated. In various embodiments, part 100 comprises a surface 102. Surface 102 may comprise, for example, a titanium metal. In various embodiments, surface 102 comprises a titanium alloy such as a titanium alloy having a composition, in weight percent, of about 6 percent aluminum, about 2 percent tin, about 2 percent zirconium, about 2 percent molybdenum, about 2 percent chromium, about 0.25 percent silicon, and the remainder titanium, commonly known by the industry standard designation of Ti-62222 and referred to herein as the same, where the term "about" in this context only refers to +/−0.15%. However, any titanium or titanium alloy is within the scope of the present disclosure.

Part 100 may comprise, for example, a titanium part used in aeronautic applications. For example, part 100 may comprise a segment or portion of landing gear 10. In various embodiments, part 100 comprises a landing gear main cylinder. In such embodiments, surface 102 may comprise an inner surface or outer surface of part 100. Although described with reference to a specific part 100, any titanium metal part having a titanium surface 102 is within the scope of the present disclosure.

Figure 2A:
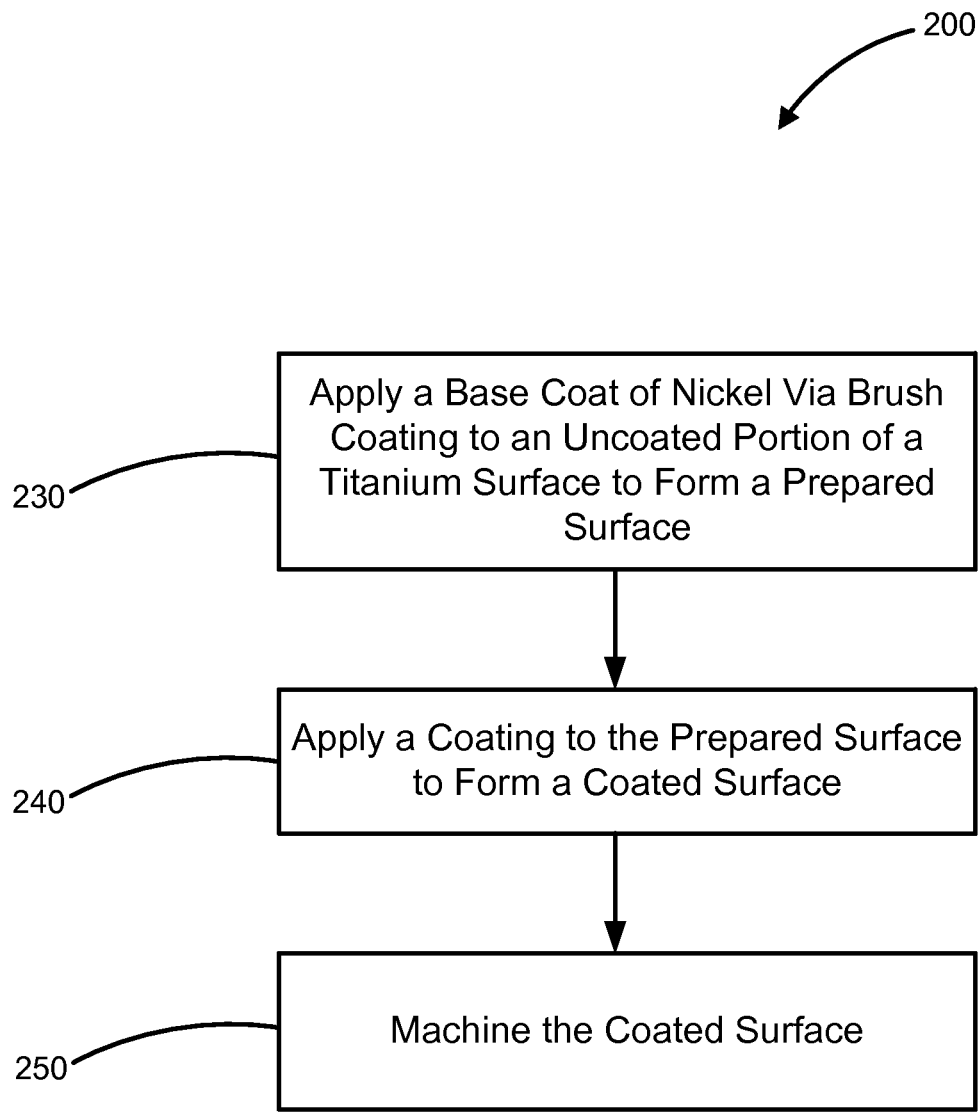
FIGS. 2A and 2B illustrate, respectively, a method for coating the surface of a titanium metal part and a cross sectional view of a titanium part in accordance with the present disclosure.
Figure 2B:
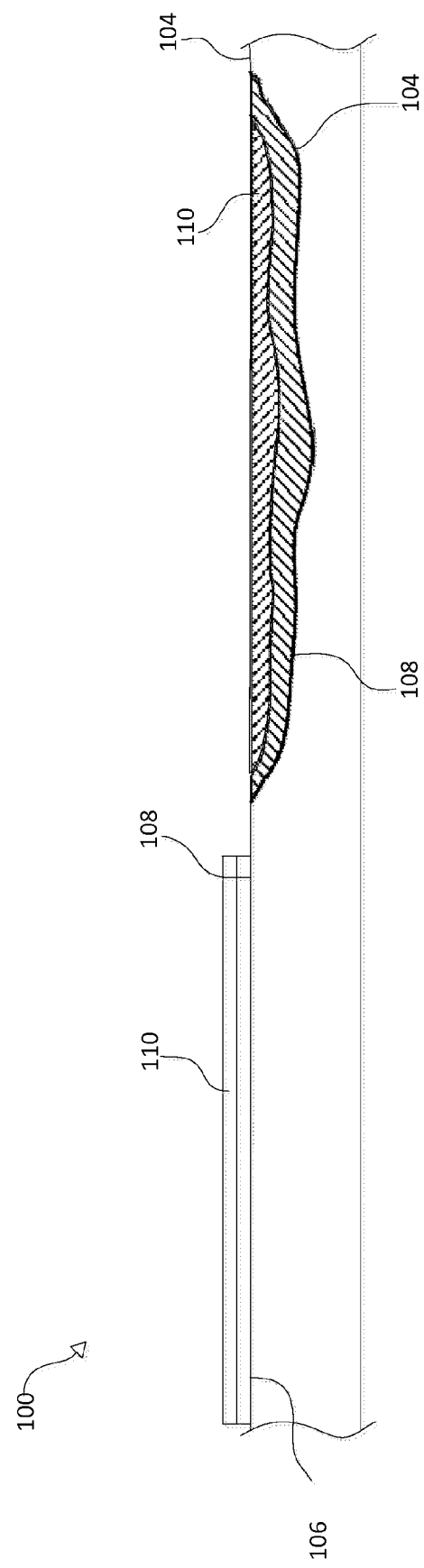

With reference to FIG. 2B, surface 102 may comprise, for example, a damaged portion 104. In various embodiments, damaged portion 104 may be a portion of surface 102 that is eroded, abraded, worn, or otherwise damaged during operation of the aircraft. Such damage may weaken part 100 and make it susceptible to further damage including cracking, breaking, or other damage that may lead to failure of part 100. As such, methods to repair and/or enhance surface 102, including damaged portion 104, may be beneficial. Damaged portion 104 of surface 102 may, in various embodiments, be repaired by restoring or replacing the eroded or lost material with a coating. Further, damaged portion 104 may comprise a portion of surface 102 that was previously coated via a method or process of the present disclosure, and has eroded or worn to the point that it requires repair.

In various embodiments, portions of surface 102 may be coated with a layer of desired thickness. For example, surface 102 may comprise an uncoated portion 106. All or part of surface 102 may be uncoated titanium, and it may be desired to coat such uncoated portion 106 with a coating to improve wear resistance, or other characteristics of uncoated portion 106. As will be discussed, various methods are disclosed to coat uncoated portion 106 with a metallic coating such as, for example, a nickel coating.

With reference to FIG. 2A, a method 200 for coating a titanium surface is illustrated. Method 200 may comprise, for example, a step 230 of applying a base coat of nickel via brush coating to an uncoated portion of a titanium surface to form a prepared surface. Step 230 may comprise providing part 100 having a surface 102 that has not been coated, such as uncoated portion 106. In various embodiments, surface 102 comprises titanium, which traditionally is difficult to coat. As previously mentioned, surface 102 may comprise a titanium alloy such as Ti-62222. However, any suitable uncoated surface is within the scope of the present disclosure.

With reference to FIG. 2B, in various embodiments, a base coat is applied to a portion of surface 102 via a brush coating process. For example, the base coat may be applied to damaged portion 104 and/or uncoated portion 106. Step 230 may comprise using a brush coating electroplating process to apply a layer of base coat having a thickness, for example, of approximately 0.0005 inches (~0.013 millimeters). In various embodiments, step 230 may comprise applying a base coat of nickel to a localized region, such as damaged portion 104 and/or uncoated portion 106. Damaged portion 104 and/or uncoated portion 106 may be isolated from the remainder of surface 102 by, for example, masking. Further, the brush coating process may comprise applying the base coat of nickel using a brush-style anode containing electrolyte solution in electrical contact with the portion to be coated (e.g., damaged portion 104 and/or uncoated portion 106). Surface 102 and/or part 100 may operate as a cathode, and nickel is deposited from the electrolyte solution to form the base coat. In various embodiments, with reference to FIG. 2B, step 230 produces a prepared surface 108. The base coat of prepared surface 108 may provide a substrate for further coatings, as will be described.

In various embodiments, method 200 further comprises a step 240 of applying a coating material to the prepared surface to form a coated surface. For example, a coating such as nickel may be applied to prepared surface 108 to form a coated surface 110. The coating of step 240 may provide a more substantial and/or thicker layer of coating than the base coat of prepared surface 108. For example, the brush coating process of step 230 may provide a base coat that is insufficiently thick to impart desired properties to surface 102. The coating of step 240 may provide sufficient thickness of coating (e.g., nickel) to impart such desired properties to surface 102.

In various embodiments, a nickel coating is applied via an electroless process. In such embodiments, a nickel alloy such as nickel-phosphorous or nickel-boron is deposited on prepared surface 108 in the presence of a suitable reducing agent, such as a hydrated sodium hypophosphate.

In various embodiments, a nickel coating is applied to prepared surface 108 via an electroplating process. For example, a nickel coating such as nickel sulfamate may be electroplated to prepared surface 108 to form coated surface 110. Although described with reference to specific embodiments, any manner of coating prepared surface 108 with nickel to form coated surface 110 is within the scope of the present disclosure.

In various embodiments, coated surface 110 comprises a predetermined thickness. For example, step 240 may result in a coated surface 110 having a final desired and/or predetermined thickness of surface 102. In other embodiments, coated surface 110 may have a thickness greater than a final desired and/or predetermined thickness.

Method 200 may further comprise, for example, a step 250 of machining the coated surface. In various embodiments, step 250 comprises machining coated surface 110 to a final desired and/or predetermined thickness. Any manner of machining coated surface 110 to a final desired and/or predetermined thickness is within the scope of the present disclosure.

Figure 3A:
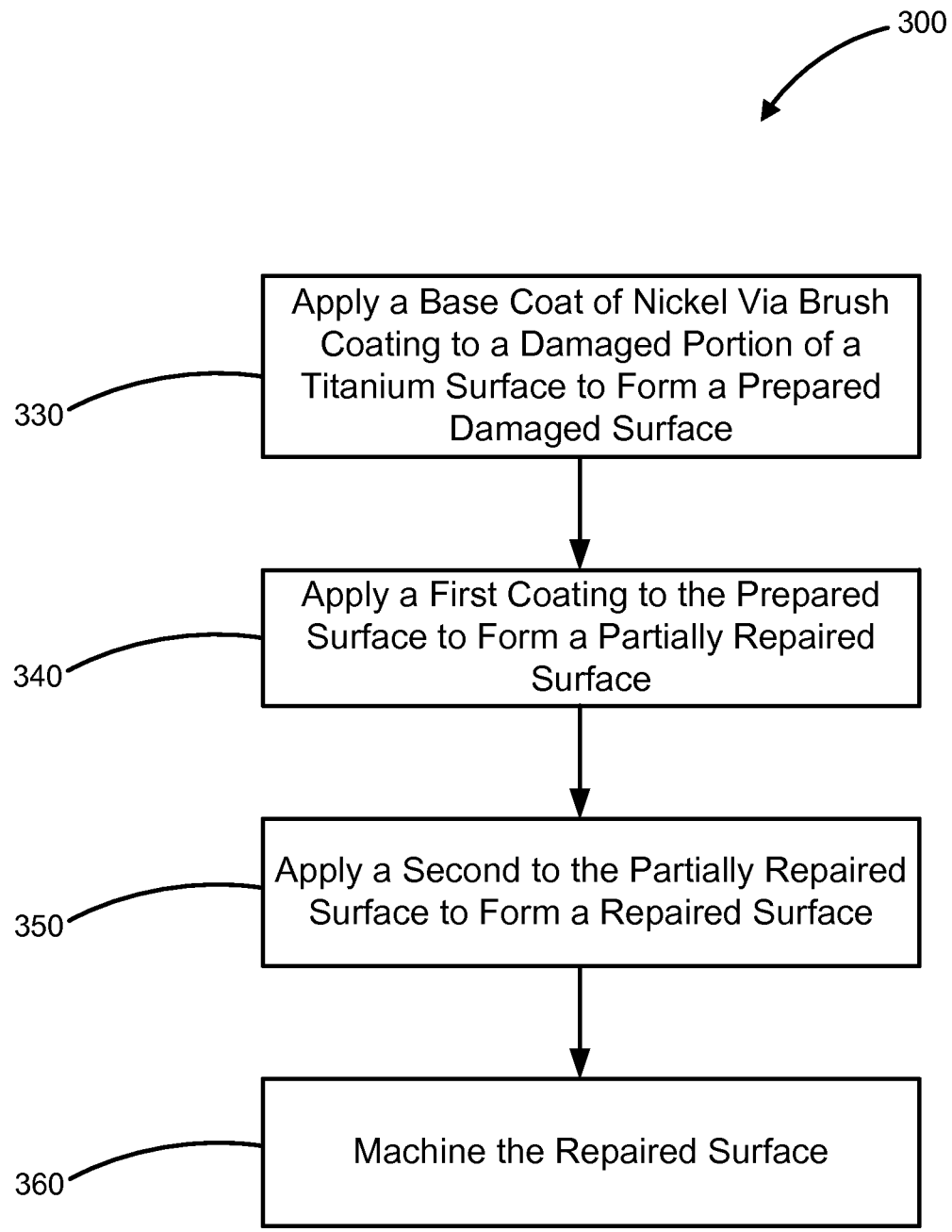
FIGS. 3A and 3B illustrate, respectively, a further method for coating the surface of a titanium metal part and a cross sectional view of a titanium part in accordance with the present disclosure.

With reference to FIG. 3A, a method 300 for repairing a damaged titanium surface is illustrated. As will be discussed in detail, in various embodiments, method 300 may be utilized to provide a base layer, first coating, and second coating to any portion of surface 102, including damaged portion 104. In various embodiments, method 300 may be utilized to repair a damaged portion 104 of surface 102 which has been damaged by abrasion, wear, or other types of damage.

Figure 3B:
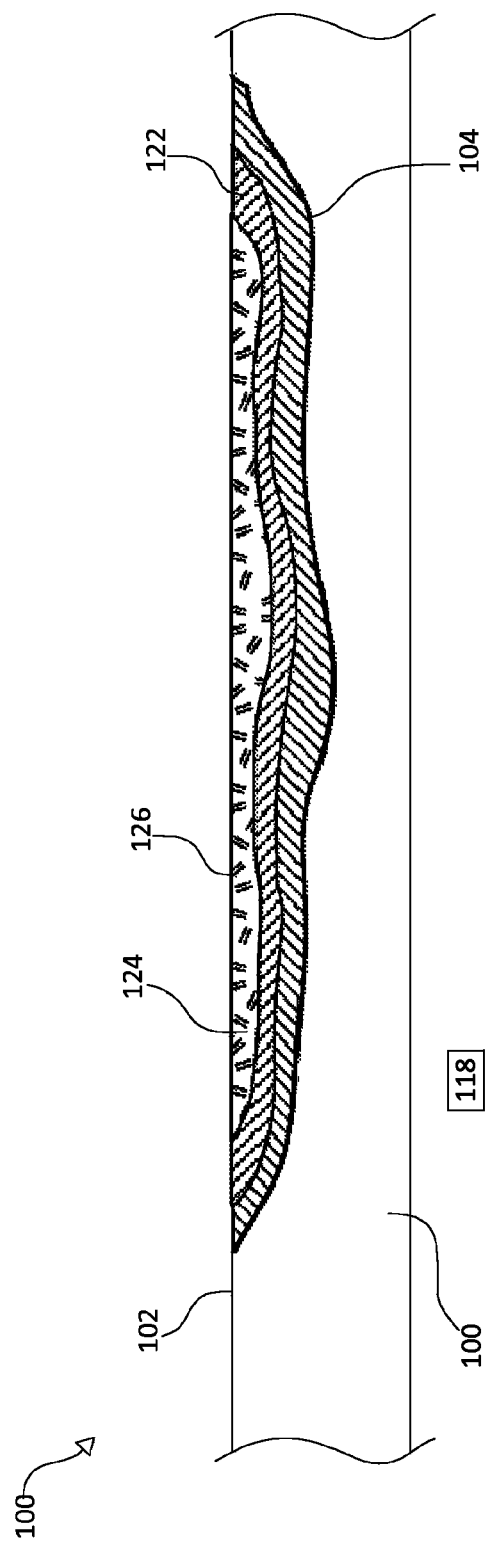

Method 300 may comprise, for example, a step 330 of applying a base coat of nickel via a brush coating process to a damaged portion of a titanium surface to form a prepared surface. Similar to step 230 of method 200, in step 330, a base coat may be applied to damaged portion 104. Step 330 may comprise using a localized brush coating process to apply a layer of base coat having a thickness, for example, of approximately 0.0005 inches (~0.013 millimeters). In various embodiments, with reference to FIG. 3B, applying a layer of base coat to damaged portion 104 produces a prepared damaged surface 118.

In various embodiments, method 300 further comprises a step 340 of applying a first coating to the prepared damaged surface to form a partially repaired surface. For example, a first coating may be applied to prepared damaged surface 118 to form a partially repaired surface 122. In various embodiments, the first coating may comprise a nickel-based coating. In other embodiments, the first coating may comprise a non-nickel metallic coating, such as a chrome or cobalt coating.

The first coating of step 340 may be applied to prepared damaged surface 118 via an electroless process. In an embodiment, a nickel alloy such as nickel-phosphorous or nickel-boron is deposited on a prepared damaged surface 118 in the presence of a suitable reducing agent, such as a hydrated sodium hypophosphate. In further embodiments, a first coating is applied to prepared damaged surface 118 via an electroplating process. For example, with reference to FIG. 3B, a nickel first coating such as nickel sulfamate may be electroplated onto prepared damaged surface 118 to form partially repaired surface 122. Although described with reference to specific embodiments, any manner of coating prepared damaged surface 118 to form partially repaired surface 122 is within the scope of the present disclosure.

In various embodiments, partially repaired surface 122 comprises a thickness less than a predetermined thickness. For example, step 340 may result in partially repaired surface 122 comprising a thickness less than that of uncoated and/or undamaged portions of surface 102.

Method 300 may further comprise, for example, a step 350 of applying a second coating to a partially repaired surface to form a repaired surface. In various embodiments, step 350 may comprise applying a second coating of nickel to partially repaired surface 122 to form a repaired surface 124. For example, a nickel second coating may be applied via an electroless process, wherein a nickel alloy such as nickel-phosphorous or nickel-boron is deposited on a partially repaired surface 122 in the presence of a suitable reducing agent, such as a hydrated sodium hypophosphate. In an embodiment, method 300 comprises applying a base coat via brushless coating (step 330), applying a first coating via an electroplating process (step 340), and applying a second coating via an electroless process (step 350). Although described with reference to specific embodiments, any manner of coating partially repaired surface 122 to form a repaired surface 124 is within the scope of the present disclosure.

Step 340 may further comprise additional processing of the first layer. For example, after the first layer is deposited to partially repaired surface 122 to form repaired surface 124, repaired surface 124 may be machined, polished, or otherwise physically processed.

In various embodiments, the first coating of step 340 and the second coating of step 350 comprise nickel coatings applied via different methods. For example, step 340 may comprise applying a nickel first coating via an electroless process, followed by step 350 which comprises applying a sulfamate nickel second coating via an electroplating process.

Further, step 350 may comprise forming a repaired surface 124 having a thickness equal to a desired and/or predetermined thickness. For example, step 350 may produce a finished surface 126 of a desired and/or predetermined thickness without the need for further processing. In further embodiments, repaired surface 124 may have a thickness greater than a desired and/or predetermined thickness. As will be discussed, in such embodiments, repaired surface 124 may require further processing to achieve the desired and/or predetermined thickness.

Method 300 may further comprise, for example, a step 360 of machining the repaired surface. In various embodiments, step 360 comprises machining repaired surface 124 down to a final desired and/or predetermined thickness to form finished surface 126. Any manner of machining repaired surface 124 to a final desired and/or predetermined thickness to form finished surface 126 is within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for repairing a damaged titanium surface of a landing gear part comprising:
    masking an undamaged titanium surface leaving the damaged titanium surface of the landing gear part exposed, wherein the damaged titanium surface having a depth in the orthogonal direction from the undamaged titanium surface;
    applying a base coat of nickel via brush coating electroplating process to the damaged titanium surface to form a prepared damaged surface, wherein the undamaged titanium surface is used as a cathode during the brush coating electroplating process and the base coat comprising a thickness of approximately 0.0005 inches;
    applying a nickel first coating to the prepared damaged surface to form a partially repaired surface; and
    applying a second coating via an electroless process to the partially repaired surface to form a repaired surface,
    wherein the landing gear part comprises a titanium alloy having a composition, in weight percent, of about 6 percent aluminum, about 2 percent tin, about 2 percent zirconium, about 2 percent molybdenum, about 2 percent chromium, about 0.25 percent silicon, and the remainder titanium, and wherein a total thickness of the base coat of nickel, the nickel first coating and the second coating is equal to a thickness of the depth in the orthogonal direction from the undamaged titanium surface.

2. The method of claim 1, wherein the second coating is nickel.

3. The method of claim 2, wherein the second coating is a sulfamate nickel coating.

4. The method of claim 1, wherein the first coating is applied via an electroless process.

5. The method of claim 1, wherein the repaired surface comprises a thickness that is substantially the same as a thickness of an undamaged surface.

6. The method of claim 1, further comprising a step of machining the repaired surface to a predetermined thickness to form a finished surface.

* * * * *